United States Patent
Mirek et al.

(10) Patent No.: US 8,619,936 B2
(45) Date of Patent: Dec. 31, 2013

(54) CLOCK SWITCHING ALGORITHM BASED ON PREFERRED CLOCK SOURCE

(75) Inventors: Beata Mirek, Ottawa (CA); Glen Rempel, Ottawa (CA); Keith Dysart, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/444,359

(22) Filed: Apr. 11, 2012

(65) Prior Publication Data

US 2013/0272362 A1    Oct. 17, 2013

(51) Int. Cl.
*H04L 7/00* (2006.01)

(52) U.S. Cl.
USPC ............ 375/371; 370/503; 370/510; 370/350

(58) Field of Classification Search
None
See application file for complete search history.

(56) References Cited

U.S. PATENT DOCUMENTS

| | | | |
|---|---|---|---|
| 5,963,606 A | 10/1999 | Drost et al. | |
| 6,539,026 B1 | 3/2003 | Waclawsky | |
| 7,613,212 B1 * | 11/2009 | Raz et al. | 370/510 |
| 7,991,016 B2 * | 8/2011 | Cankaya et al. | 370/503 |
| 2002/0193146 A1 | 12/2002 | Wallace et al. | |
| 2006/0045020 A1 | 3/2006 | Picco et al. | |
| 2009/0245228 A1 | 10/2009 | Osterling | |
| 2011/0116440 A1 | 5/2011 | Shimada et al. | |

FOREIGN PATENT DOCUMENTS

| | | |
|---|---|---|
| EP | 2110973 A2 | 10/2009 |
| WO | WO2009135160 A2 | 11/2009 |
| WO | WO2013064937 A1 | 5/2013 |

OTHER PUBLICATIONS

PCT/IB20123/051748 International Search Report.

* cited by examiner

*Primary Examiner* — Leon-Viet Nguyen
(74) *Attorney, Agent, or Firm* — Jean-Pierre Fortin; Ericsson Canada Inc.

(57) ABSTRACT

A radio system having multi-standard mixed mode radios is described. The mixed mode radios are used to support combining of digital baseband from a first and a second radio equipment controller. A primary clock associated with the first radio equipment controller and a secondary clock associated with the second radio equipment controller is provided. The quality of the primary clock is evaluated and the primary clock is referenced to the first radio equipment controller if the clock is determined to have appropriate quality factors. The quality of the secondary clock is then evaluated and the secondary clock is referenced to the second radio equipment controller if the secondary clock is determined to have appropriate quality factors. The second radio equipment controller is then referenced to the primary clock once the primary and secondary clocks are aligned.

19 Claims, 5 Drawing Sheets

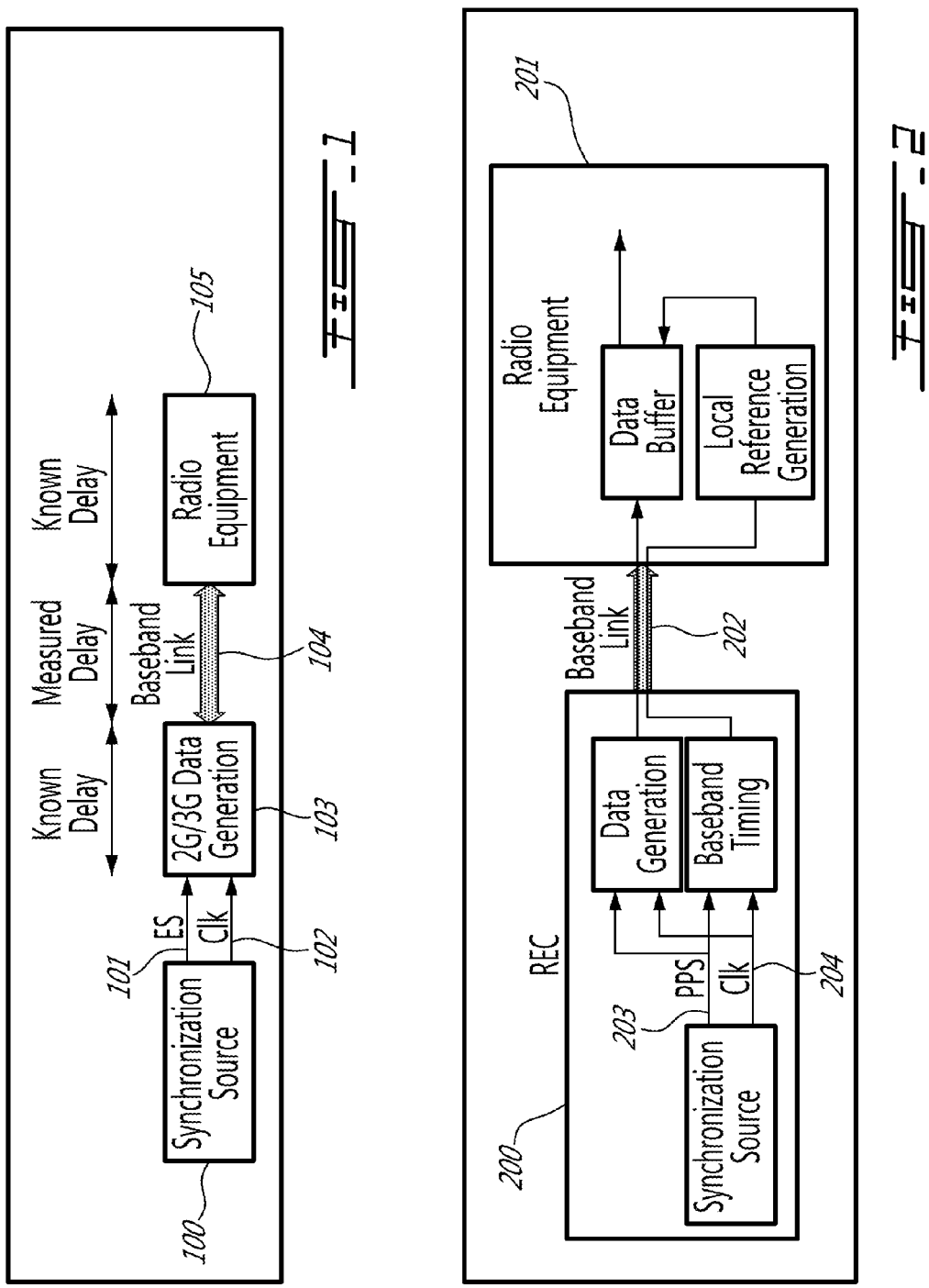

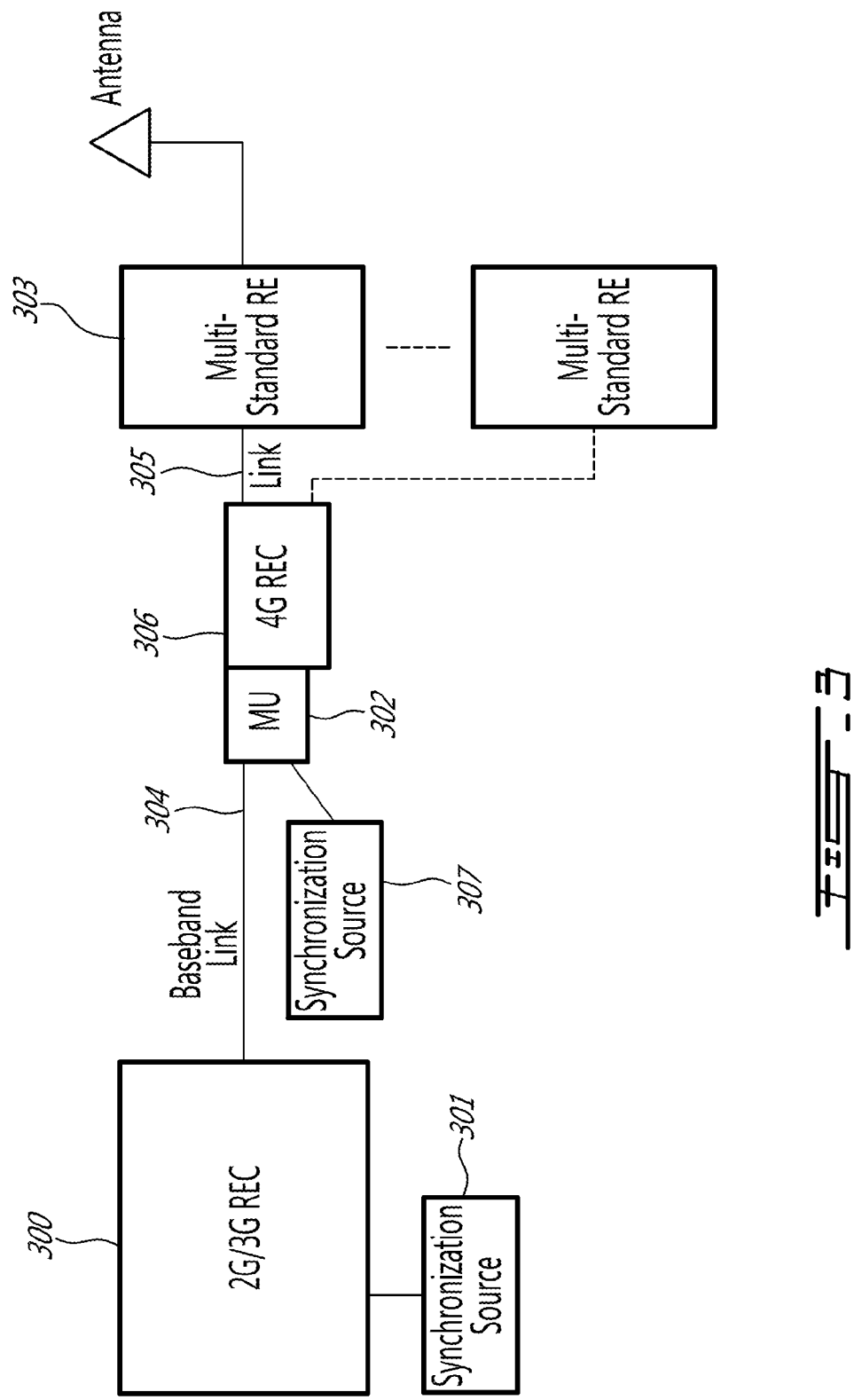

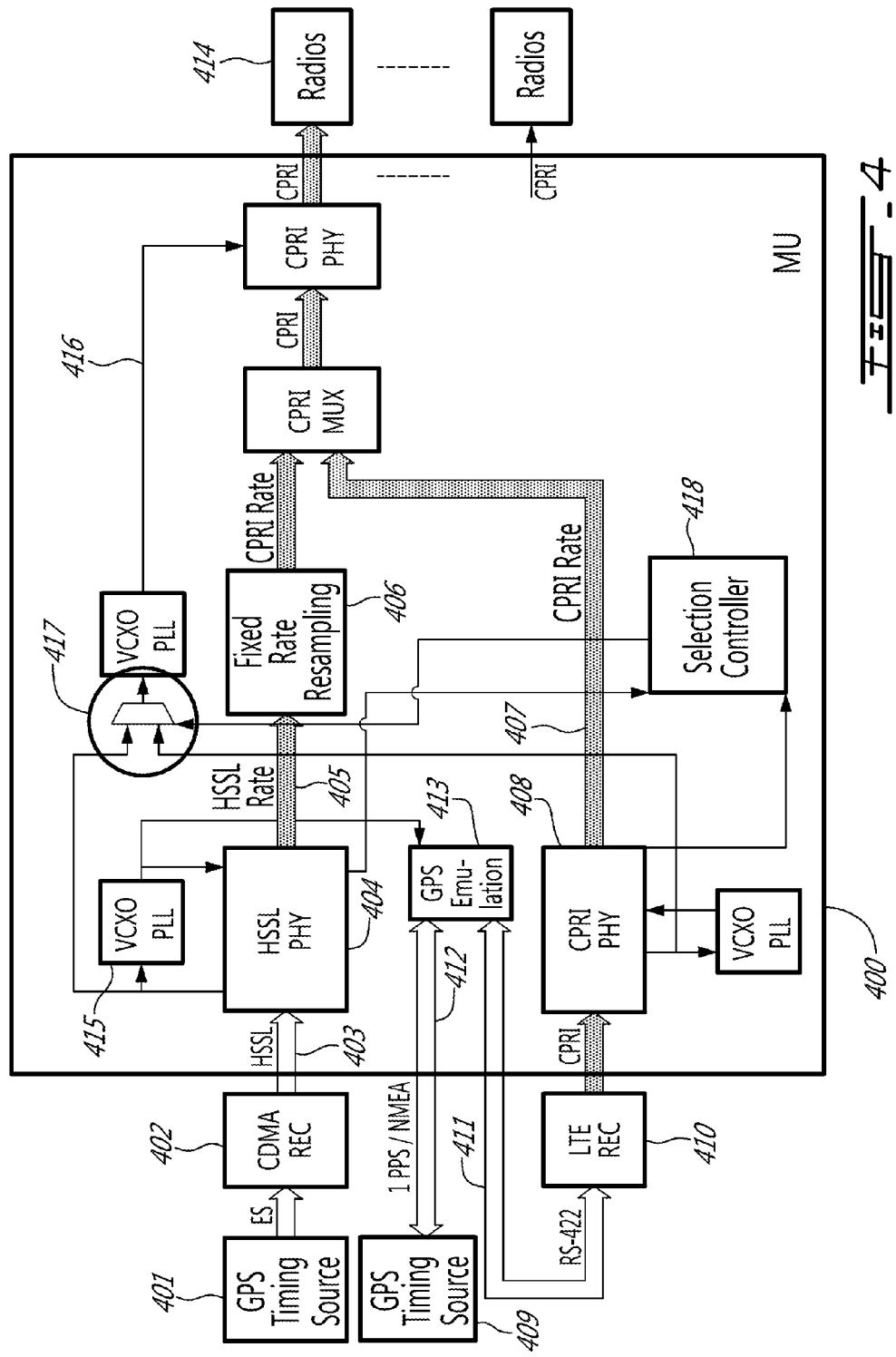

| Bit 0 | Bit 1 | Message |
|---|---|---|
| 1 | 1 | Obtain clock reference from secondary clock source, do not switch to primary clock source |
| 0 | 0 | Obtain clock reference from primary clock, do not switch to secondary clock source |
| 1 | 0 | Automatically switch to primary clock source if secondary clock source fails |
| 0 | 1 | Automatically switch to secondary clock source if primary clock source fails |

FIG. 5

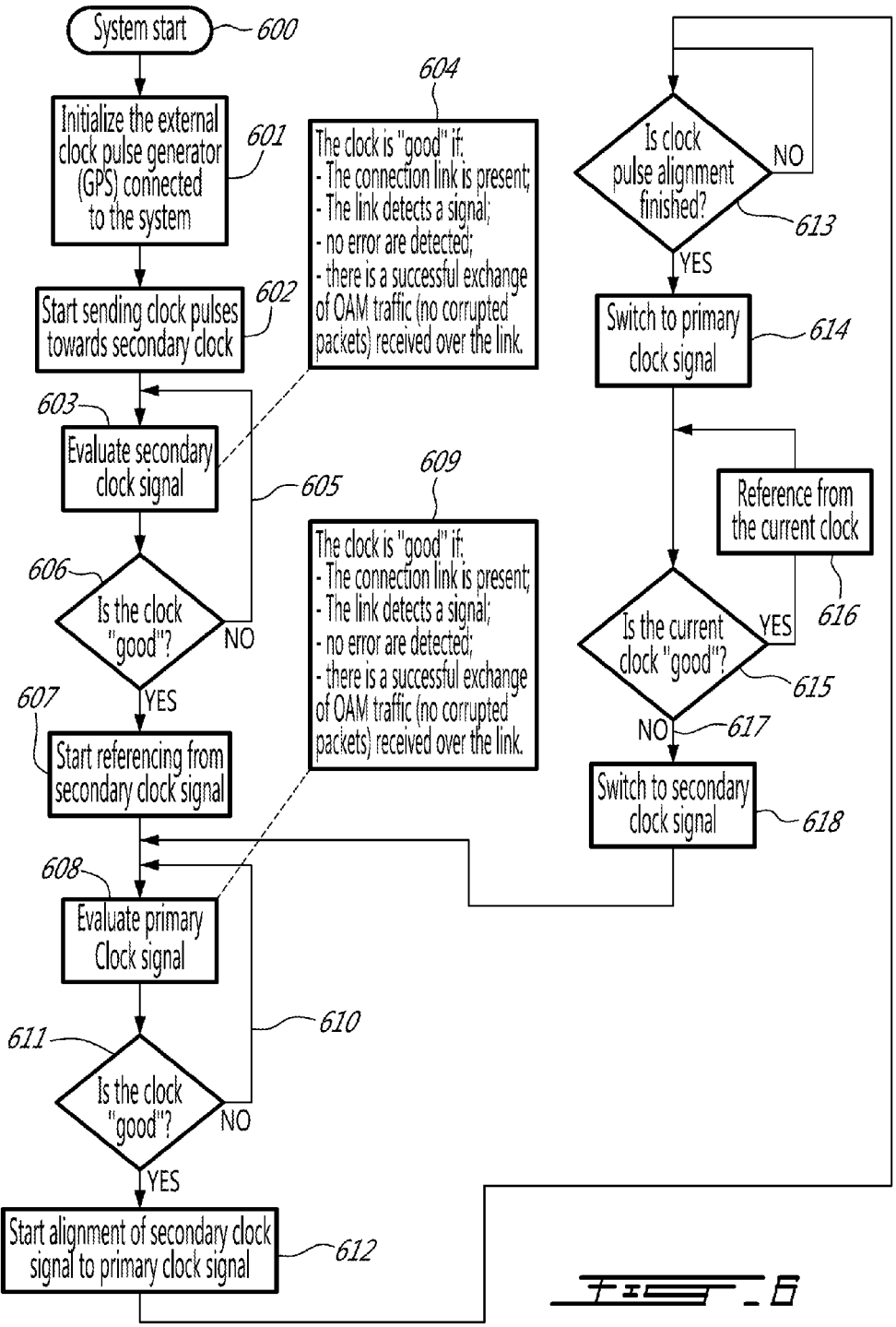

CLOCK SWITCHING ALGORITHM BASED ON PREFERRED CLOCK SOURCE

CROSS-REFERENCE TO RELATED APPLICATION

This application is a related to U.S. patent application Ser. No. 13/287,364 filed Nov. 2, 2011.

FIELD OF THE INVENTION

The present application relates generally to clock synchronization and switching, more specifically, to clock switching in shared baseband deployments.

BACKGROUND OF THE INVENTION

Network operators upgrading their networks from 2G/3G networks to 4G networks want a network evolution solution which permits the leveraging of a portion of their installed baseband equipment. In some cases this means that multi-standard mixed mode radios are used to support efficient in-band combining to ease the service transition from 2G/3G equipment to 4G. Emerging deployments of shared radio solutions for base stations operating on multiple standards face particular challenges in relation to operating with clock synchronization. Each standard usually runs in its own clocking domain.

When the timing or synchronization reference is temporarily lost, a network's ability to maintain time and sync stability becomes critical to ensure continued optimal network performance. The time period that a network is able to maintain time and sync stability without a reference is called the holdover time.

Precise synchronization is especially critical in mobile networks for the successful call signal handoff and proper transmission between base stations, as well as for the transport of real-time services. If individual base stations drift outside the specified frequencies or time alignment, mobile handoff performance decays, calls interfere, and calls cannot be made, resulting in high dropped-call rates and impaired data services. In the event that timing or synchronization reference is temporarily lost, a network's ability to maintain time or "holdover" becomes critical to ensure optimal network performance.

These synchronization issues are more significant in shared baseband deployments since holdover requirements are not standard; that is, they vary depending on the system type, complexity, and operator's requirements. In shared baseband deployments, two heterogeneous systems with independent synchronization inputs are expected to produce outputs which are synchronized to one another, typically so that they can be combined together without loss of data. Existing clock synchronization solutions provide limited holdover capabilities in the case where one or both of the systems lose their synchronization inputs, leading to the outputs becoming unsynchronized with each other. Once the clock of one system is synchronized with the clock of the shared system, switching to a single clock can be initiated. However, the system must be able to switch the radio reference clock between a primary clock and a secondary clock in the event one or the other fails. Recovery or switching back to the main or primary clock should only occur if the clock is considered to have a stable source.

For these reasons, traditional synchronization and clock switching techniques have limited capabilities in situations as described above.

SUMMARY OF THE INVENTION

The present invention is directed to alleviating the problems of the prior art.

The present invention overcomes the problems of the prior art by providing a method of switching from one clock source to another wherein synchronization is provided from one system to the other by recovering a clock from one system's output, then using that synchronization to regenerate a synchronization source for the other system. This allows synchronization between systems to be maintained even in the case where the input synchronization source is lost. In addition, if the timing source of one system starts to drift with the loss of its reference signal, the second system will drift along with it such that the timing remains consistent between the two networks.

In a first embodiment, the present invention describes a method of providing timing synchronization between a first and second radio equipment controller operating with one or more multi-standard radios. The first radio equipment controller receives a synchronization signal from a primary synchronization source. A synchronized data output is generated from the synchronization signal to create a primary clock signal. The quality of the primary clock signal is then evaluated. The primary clock signal is then referenced to the first radio equipment controller if the clock signal is determined to have appropriate quality factors. A synchronization signal is received at the second radio equipment controller from a secondary synchronization source. A synchronized data output is then derived from the secondary synchronization signal to create a secondary clock signal. The quality of the secondary clock signal is then evaluated. The secondary clock is then referenced to the second radio equipment controller if the clock signal is determined to have appropriate quality factors. The secondary and primary clocks are then aligned and the second radio equipment controller is then referenced to the primary clock once the clocks are aligned.

Other aspects and features of the present invention will become apparent to those of ordinary skill in the art upon review of the following description of specific embodiments of the invention in conjunction with the accompanying figures.

BRIEF DESCRIPTION OF THE DRAWINGS

FIG. 1 is a block diagram illustrating the timing principles of a 2G/3G base station;

FIG. 2 is a block diagram illustrating the timing principles of a 4G base station;

FIG. 3 is a block diagram illustrating a high level topology of a base station radio system according to the present invention;

FIG. 4 is a block diagram of an Multiplexing Unit (MU) according to the present invention;

FIG. 5 illustrates a 2 bit table used to convey switching control information for use with the MU of FIG. 4; and FIG. 6 is a flow diagram of a clock switching algorithm according to an embodiment of the invention.

DETAILED DESCRIPTION OF THE EMBODIMENTS

In order to lighten the following description, the following acronyms will be used:
BTS Base Station
CBTS CDMA Base Station
CDMA Code Division Multiple Access CPRI Common Public Radio Interface
GNSS Global Navigation Satellite System
GPS Global Positioning System
HSSL High Speed Serial Link
LTE REC LTE Digital Radio Equipment Controller
MU Multiplexer Unit
NMEA National Marine Electronics Association
PHY Physical Interface
RE Radio Equipment
REC Radio Equipment Controller As will be described below, the primary or preferred clock source can be that of any of the network operator's primary deployed systems. For example, if a network operator is to expand a CDMA network with a new 4G network, the operator is likely to select the clock of the CDMA system as it's primary or preferred clock to which the 4G network will be synchronized. In some circumstances, a secondary clock will become preferred if the primary clock fails. In either case, the operator requires that a suitable clock be used and available at all times to maintain adequate network synchronization.

With reference to FIG. 1, we have shown a block diagram illustrating the timing principles of a 2G/3G BTS. A timing source 100, such as a GPS signal creates an ES (even second) mark 101 synchronized to GPS time, along with an associated (phase-locked) clock 102. It provides these signals to the 2G/3G Data generation equipment 103, which uses them to generate the required codes with an advance with respect to this mark. The amount of this advance is determined by the delay of the radio and the baseband link 104 to the radio equipment 105.

With reference to FIG. 2, we have shown a block diagram illustrating the timing principles of a 4G BTS. In this case, a Radio Equipment Controller (REC) 200 is connected to the Radio Equipment (RE) 201 via a baseband link 202. The REC likewise has a time alignment requirement. The REC 200 receives a GPS timing reference consisting of a PPS (pulse per second) signal 203 and associated clock 204. These signals are used to generate the framing information for the baseband link. At the radio side 201, a local timing reference is created. An offset needs to be applied to this timing reference to make it match up with the REC time. To determine this number, the REC measures the delay of the baseband link. Also, the radio equipment tells the REC what its delay is. The REC then sends a message to the radio to tell it how much to advance it's time base, and where to find the first sample of the downlink (DL) frame in the baseband frame.

With reference to FIG. 3, we have shown a block diagram illustrating a high level topology of a multi-standard base station radio system according to the present invention.

In the embodiment of FIG. 3, the radio system is comprised of a 2G/3G REC 300 which, as an example, may continue to be serviced by a wireless operator wanting to maintain a 2G/3G network but considering expanding its network to include 4G services. The 2G/3G REC continues to receive timing signals from a GPS Time Source 301.

An interface 302, hereinafter referred to as a multiplexer unit (MU) is provided as an interface that provides the ability to co-locate 4G traffic with 2G/3G traffic on one or more shared radios 303. As indicated previously, one of the requirements for this configuration is that timing must be consistent between the two networks. Since both networks use separate GPS sources for timing, there is a need for a common synchronization between the 2G/3G REC 300 and the 4G REC 306. The 2G/3G REC generates its timing source on one baseband link 304 whereas the 4G REC makes use of another baseband link 305 but both are intended to share one or more common multi mode radios 303. As described earlier, a problem can exist when the GPS signal or synchronization source is lost or unavailable. Timing signal drift is enough to cause FIFO overflow problems. As will be explained further below, synchronization can be achieved by linking the timing between the 2G/3G REC 300 and the 4G REC 306.

In the preferred embodiments to be described further below, the MU is used to co-locate CDMA traffic with LTE traffic. It will be understood to those knowledgeable in the art that 2G/3G traffic other than CDMA can also be co-located with an LTE or other 4G traffic according to the teachings of the present invention.

The following description makes use of the terms HSSL (High Speed Serial Link) and CPRI (Common Public Radio Interface). Both HSSL, a proprietary communications protocol and CPRI define an interface for base stations, commonly used between the Radio Equipment Controllers (REC) and local or remote radio units, known as Radio Equipment (RE) and may also be referred to as baseband link in the following description. It will be known to those knowledgeable in the art that the actual interface is not limited to what has been particularly shown and described herein above.

With reference to FIG. 4, we have shown a block diagram of the MU 400, which is used as interface between the CDMA REC and LTE REC to synchronize the timing between the baseband units. A GPS source 401 provides an ES (even second) mark synchronized to GPS time to CDMA REC 402. Similarly, GPS source 401 makes use of a received synchronization signal to generate a phase-locked clock signal. An HSSL baseband signal 403 is generated using this phase-locked clock signal. The VCXO PLL 415 is locked to the CDMA clock and a 1PPS signal is derived from the VCXO, block 413. A 1 PPS signal is output at the rate of 1 pulse per second. This reference clock signal is fed to the HSSL PHY 404 to create an HSSL rate 405 with VCXO PLL 415 at the egress side the HSSL PHY. It is also used as the reference clock 416 on the radio side.

If there is no consistent timing from the clocking signal of the baseband link 403, the actual rate which would be coming out from the fixed rate re-sampling block 406 could vary and also affect the CPRI rate 407 coming from the CPRI PHY 408 by an amount related to the difference in the timing.

At the LTE equipment side, the GPS source 409, normally connected to the LTE REC 410 is instead connected to the MU 400, and the MU is connected via link 411 to the LTE REC 410 on the port normally used by GPS source 409 to provide the 1PPS and NMEA messages directly.

The MU 400 has the ability to select the incoming pulse it wants to use from one of two possible sources, one from a synthetic PPS recovered from the HSSL baseband link 403 and one from the GPS source 409. As will be explained further below, this selection will depend on the quality factors of the baseband link.

At the LTE REC 410, a set of NMEA messages 412 is received from the GPS source 409 in addition to the 1PPS pulse. This is accomplished by passing the NMEA messages 412 from the GPS source 409 to the LTE REC 410 via a GPS Emulation block 413. The data in the messages passed through are cached in case the GPS fails in some way and stops sending messages. The NMEA messages are logically cached in block 413. Even with the GPS source 409 connected to the MU 400, the MU 400 can choose to generate the 1PPS to the LTE REC 410 either from the connected GPS source 409 or using a synthetic 1PPS generated from the HSSL baseband link timing 403. Although the HSSL source is preferred over the GPS source (once the phase of the HSSL source is aligned with the GPS), if the HSSL source 403 fails, the MU will make use of the GPS timing source 409. If the HSSL timing source 403 starts to drift, the CPRI side will drift along with it since one is synchronized with the other.

In the preferred embodiment, HSSL link 403 is the preferred or primary clock source, since using it allows for consistent timing between the CDMA REC 402 and LTE REC 410, even if the CDMA REC 402 goes into holdover mode and drifts (the LTE REC 410 will follow the drift). The selected timing will be output to the radios 414 with the CPRI baseband links that carry the data for both the CDMA and LTE networks.

A clock switch 417 is provided to enable selection of a system clock based on input from a selection controller 418. Selection controller 418 collects information from the HSSL PHY 404 and CPRI PHY 408 to determine clock quality factors. Clock quality factors include for example, the absence or presence of certain radio pluggable cards which, when removed could prevent the correct timing alignment to be performed or could indicate that certain maintenance steps are being performed disabling an available timing source. Another clock quality factor can include whether or not the PLL is properly locked to its source signal, whether there are any 8B10B errors detected and also whether there has been successful OAM traffic exchange on the HSSL and CPRI links, that is, no corrupted packets received over the link.

The selection controller 418 will not command the clock switch 417 to select a new clock source unless the clock quality factors are present at the particular clock source, that is, the primary clock from HSSL PHY 404 or secondary clock from CPRI PHY 408.

In the early stage of system initialization, only one clock source is available. In an embodiment of the invention, the secondary clock of CPRI PHY 408 is used as the LTE REC is first placed into service. It may also be feasible in some situations to have the primary clock as the available clock source at system initialization.

In the later stage of system initialization, the primary clock of HSSL PHY 404 becomes available. If the selection controller determines that the primary clock meets the quality factors, the MU starts the alignment process such that the secondary and primary clocks become aligned. As indicated previously, alignment does not start until such time as each link meets the quality factors listed above. That is, each clock should first have the required quality factors before they are aligned with each other. A full description of the alignment process is described in Applicant's co-pending U.S. patent application Ser. No. 13/287,364 filed Nov. 2, 2011.

Once the two clock signals are aligned, the selection controller 418 instructs the clock switch 417 to perform a clock switch to the primary clock of HSSL PHY 404. The system continues to operate on the primary clock until such time as the system is re-started or the primary clock fails.

If the clock reference from the preferred or primary clock fails, the system performs a switch to the secondary clock. The system performs a clock alignment or synchronization between primary and secondary clocks each time recovery is necessary.

The selection controller 418 of FIG. 4 conveys switching control information to the clock switch 417 using a simple 2 bit table, illustrated in FIG. 5. As shown therein, a 1 1 bit stream instructs the switch to continue to obtain a clock reference from the secondary clock source and not to switch to the other clock source. A 0 0 bit stream instructs the switch to continue to obtain a clock reference from the primary clock source and not to switch to the other clock source. A 1 0 bit stream instructs the switch to select the primary clock source as the secondary clock source has failed and a 0 1 bit stream instructs the switch to select the secondary clock source as the primary clock source has failed.

With reference to FIG. 6, we have shown a flow diagram illustrating the steps taken as the system gets ready to perform a switch from one clock to another. It should be noted that the clock evaluation sequence presented in FIG. 6 is sequential. That is, the quality of the clock signal is evaluated first for the primary clock then the secondary clock. Alternatively, the evaluation can be done simultaneously for both clocks and continuously during normal operation of the system.

At system start, block 600, the external clock pulse generator (GPS) connected to the system is initialized, block 601. This clock pulse generator starts sending clock pulses towards the secondary clock source, block 602. Since the status of the secondary clock source is unknown at this time, a request is made for evaluation of the secondary clock source to analyze its quality factors. The quality factors are listed at box 604.

If the clock is not yet ready, path 605, the analysis continues. If the clock is deemed to be good, block 606, the LTE REC can start using the secondary clock source, block 607.

At block 608, quality factors of the primary clock are analyzed. The quality factors are listed at box 609. If the clock is not yet ready, path 610, the analysis continues. If the clock is deemed to be good, block 611 then both the primary and secondary clocks are deemed to be good and alignment and synchronization of the primary and secondary clocks is started, block 612. If aligned, block 613, instructions are sent to switch the system reference clock to the primary clock, block 614. Otherwise, clock alignment continues.

Monitoring of the primary clock is conducted at block 615. If the clock is good, reference to that clock continues block 616. If the primary clock fails, path 617, the system reference clock is switched to the secondary clock, block 618 until evaluation of the primary clock back at block 608 is deemed to have the appropriate quality factors.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, e.g., a router, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Thus, one embodiment is a computer readable medium containing computer readable instruction that, when executed by a processor, cause the processor to perform functions for maintaining clock synchronization between a first and a second radio.

In addition, unless mention was made above to the contrary, it should be noted that all of the accompanying drawings are not to scale. It will be appreciated by persons skilled in the art that the present invention is not limited to what has been particularly shown and described herein above. A variety of modifications and variations are possible in light of the above teachings without departing from the scope and spirit of the invention, which is limited only by the following claims.

We claim:

1. A method of providing timing synchronization between a first Radio Equipment Controller (REC) operating on a first radio standard and a second REC operating on a second radio standard, each REC communicating with one or more multi-standard radios, comprising the steps of:

receiving at said first REC a synchronization signal from a primary synchronization source associated with said first radio standard;

generating a synchronized data output derived from said synchronization signal to create a primary clock signal;

evaluating the quality of said primary clock signal;

referencing said primary clock signal to said first REC if said clock signal is determined to have appropriate quality factors;

receiving at said second REC a synchronization signal from a secondary synchronization source associated with said second radio standard;

generating a synchronized data output derived from said secondary synchronization signal to create a secondary clock signal;

evaluating the quality of said secondary clock signal;

referencing said secondary clock to said second REC if said clock signal is determined to have appropriate quality factors;

aligning said secondary clock signal with said primary clock signal; and switching reference of said second REC to said primary clock once said primary and secondary clocks are aligned.

2. A method as defined in claim 1, wherein said primary and secondary clock signals are analyzed to have appropriate quality factors by detecting the presence of errors in said data output.

3. A method as defined in claim 2, wherein said secondary clock signal is analyzed to have appropriate quality factors by detecting the presence of errors in said data output.

4. A method as defined in claim 3, wherein said errors include 8B10B errors.

5. A method as defined in claim 2, wherein said primary clock signal is analyzed to have appropriate quality factors by detecting a successful exchange of data traffic at said first REC.

6. A method as defined in claim 2, wherein said secondary clock signal is analyzed to have appropriate quality factors by detecting a successful exchange of data traffic at said second REC.

7. A method as defined in claim 2, wherein said first and second REC switch over to said secondary clock if said primary clock fails and said secondary clock is confirmed to have appropriate quality factors.

8. A method as defined in claim 7, wherein said first and second REC remain referenced to said secondary clock until said primary clock is determined to have recovered and analyzed to have said appropriate quality factors.

9. A system for providing timing synchronization between a first Radio Equipment Controller (REC) operating on a first radio standard and a second REC operating on a second radio standard, each REC communicating with one or more multi-standard radios, comprising:

first generator means associated with said first radio standard and second generator means associated with said second radio standard for generating a primary and secondary clock signal, each associated with said first and second radio standard, respectively;

a clock signal detector for evaluating the quality of said primary and secondary clock signals;

a selection controller for referencing said first and second REC to one of said primary and secondary clock signals;

a synchronization interface to align said primary and secondary clock signals once each clock signal is determined to have said appropriate quality factors; and a clock switch to reference said first and second REC to one of said primary and secondary clock signals once said primary and secondary clock signals are aligned.

10. A system as defined in claim 9, wherein said primary and secondary clock signals are analyzed to have appropriate quality factors by detecting the presence of errors in said data output.

11. A system as defined in claim 10, wherein said errors include 8B10B errors.

12. A system as defined in claim 10, wherein said primary clock signal is determined to have appropriate quality factors when a successful exchange of data traffic is detected at said first REC.

13. A system as defined in claim 10, wherein said secondary clock signal is determined to have appropriate quality factors when a successful exchange of data traffic is detected at said second REC.

14. A system as defined in claim 10, wherein said first and second REC switch over to said secondary clock if said primary clock fails.

15. A system as defined in claim 14, wherein said first and second REC remain referenced to said secondary clock until said primary clock is determined to have recovered and analyzed to have said appropriate quality factors.

16. A system for maintaining timing synchronization between a first Radio Equipment Controller (REC) operating on a first radio standard and having a first synchronization source, and a second REC operating on a second radio standard and having a second synchronization source, each REC being connected and operating with one or more multi-standard radio, said system comprising:

a multiplexer connected to said first and second REC, said multiplexer monitoring said first and second synchronization source, said multiplexer having:

a first synchronization interface for receiving a first clock signal associated with said first synchronization source and for generating a clock signal synchronized to said first synchronization source; and a synchronization source emulator for receiving a second clock signal from said second synchronization source, said synchronization source emulator comparing and aligning a timing and frequency component of said second clock signal to that of said reconstructed synchronization source, such that said second REC can maintain timing synchronization with said first REC.

17. In a radio system having multi-standard mixed mode radios which are used to support combining of digital baseband from a first radio equipment controller associated with a first radio standard and a second radio equipment controller associated with a second radio standard, a method of providing redundant clock switching from a primary clock signal associated with said first radio equipment controller and a secondary clock signal associated with said second radio equipment controller, comprising the steps of:

evaluating the quality of said primary clock signal;

referencing said primary clock signal to said first radio equipment controller if said clock signal is determined to have appropriate quality factors;

evaluating the quality of said secondary clock signal;
- referencing said secondary clock signal to said second radio equipment controller if said clock signal is determined to have appropriate quality factors;
- aligning said secondary clock signal with said primary clock signal if said primary and secondary clock signals are deemed to have said appropriate quality factors; and
- switching reference of said second radio equipment controller to said primary clock signal once said primary and secondary clock signals are aligned.

18. A method as defined in claim 17, wherein said first and second radio equipment controllers switch over to said secondary clock if said primary clock fails and said secondary clock is deemed to have said appropriate quality factors.

19. A method as defined in claim 18, wherein said first and second radio equipment controllers remain referenced to said secondary clock until said primary clock is determined to have recovered and analyzed to have said appropriate quality factors.

* * * * *